UNITED STATES PATENT OFFICE.

ALFRED A. HART, OF NEW YORK, N. Y., ASSIGNOR TO HIMSELF, ARTHUR C. ROWE, OF ORANGE, NEW JERSEY, AND GEORGE C. LEAVENWORTH, OF LOUISVILLE, KENTUCKY.

METHOD OF MAKING PHOTOGRAPHIC PICTURES.

SPECIFICATION forming part of Letters Patent No. 376,802, dated January 24, 1888.

Application filed July 27, 1887. Serial No. 245,461. (Specimens.)

*To all whom it may concern:*

Be it known that I, ALFRED A. HART, of the city of New York, in the county and State of New York, a citizen of the United States of America, have invented a new and useful Method of Making Photographic Pictures for Use in Photo-Engraving, Photolithography, and other Like Reproductive Processes, of which the following is a specification.

My invention relates to the art of preparing photographic pictures for reproduction with printer's ink; and it consists, in general, of throwing an image of the photographic or other picture upon a screen in a dark-room, part of the surface of such screen being actinic and part non-actinic—*i. e.*, part capable and part incapable of reflecting the light of the image—and then of taking a photograph of the partial image as reflected from the screen.

One object of the invention is to supply in a photographic picture, without redrawing it, the graining or lining necessary for printing with printer's ink, which is done by using a screen subdivided in all parts over which the image lies into more or less minute actinic and non-actinic subdivisions, so that the entire image is reflected, but with an underground of lines or dots incorporated therein. Another analogous object is the copying of any desired part of a photographic picture without the rest for use in color-printing; and its general objects in all varieties of the process are quickness and ease of operation, economy of cost, and more artistic results than are attainable by present methods. It is especially adapted for use in ordinary trade work, such as illustrations for books, papers, magazines, advertisements, &c.

The adaptation of the process by which the underground of lines or dots may be incorporated in the picture is particularly described as follows: Within a dark room or chamber I arrange a screen upon which an image may be thrown; but instead of a white screen capable of reflecting every point of the image I subdivide it more or less minutely into actinic and non-actinic parts. This may be conveniently done by stretching a net-work of wire or thread of a non-actinic color—such as black or red—over a plain background of an actinic color—such as white or blue. The lines or dots may be of any desired design, or the design may differ in different parts. I then, by means of a magic lantern or solar camera containing an ordinary photographic negative of the picture, or in any appropriate way, throw an image of the same upon the screen. The image is reflected only from the actinic parts of the screen—*i. e.*, with intensity sufficient to substantially affect a photographic sensitive plate. Then, by means of an ordinary camera placed at any convenient point within or without the dark-chamber, I take a photograph of that image, the non-actinic parts of the screen appearing therein as lines, dots, &c. This resulting picture may be used in the same manner as a picture originally drawn in lines or dots, in order to make the gelatine or metal relief-plate, or other printing-surface, by any of the graphic reproductive processes, without redrawing or manipulation of any sort.

The process may be practiced without any enlargement upon the screen of the original picture or without any reduction in the resulting picture from the image on the screen; but in that case the net-work over the screen must be of the same fineness as necessary in the resulting picture; but by enlarging the image upon the screen and taking a reduced photograph a coarse and cheap netting may be used. For instance, with a life-size image, common dark-green wire window-netting or red mosquito-netting will yield excellent results in a picture about the size of an ordinary cut for a book. The size of the original picture and the degree of enlargement, of course, determine the necessary size of the screen, and the fineness of the net-work or other design upon the screen with the degree of reduction therefrom determines the fineness of the cross-lines in the resulting pictures. These elements may be varied according to the character of the picture or individual taste.

The main principle of this process does not depend upon any particular method of forming the image upon the screen, nor any particular method of making the screen or dividing it into actinic and non-actinic parts, but in throwing an image by means of light upon a screen capable of reflecting only part of the image and taking a photograph of the part reflected. The relative proportions of the actinic and non-actinic parts do not concern the main idea nor the minuteness of the subdivision. Thus, in the preparation of pictures for printing in several colors, as hereinafter explained, the division is into masses here and there over the image instead of into minute subdivisions all over it.

There are various ways to construct the screen having minute subdivisions besides the one described. Thus it may be a piece of cloth—such as cheese-cloth—arranged over a background; or a plain surface of white paper with black lines or cross-lines drawn or printed thereon at proper intervals, or even possibly thrown thereon from another camera; or a flat surface of wood, metal, or any material whatever with a grain or other quality, natural or artificial, but capable of producing by the well-known action of light a sufficiently-mottled or broken-up appearance upon a photographic film. So, also, the screen may consist of actinic lines upon a non-actinic background, such as would be produced by white wires over a black surface. In such case the image would lie upon the surface of the wires, and the underground of the resulting picture would consist of black lines and white dots. The nature of the screen would frequently depend upon the character of the result desired, one producing a brilliant, and another a soft tone.

By another feature of my invention additional to that just described I can produce artistic effects not heretofore attainable with photographic pictures to be reproduced by the printing-press without costly hand-work upon the plates. The fault of other processes, by which the graining, &c., has been added to the photograph mechanically, has been that without such costly hand-work it has produced a flat picture, one with little relief and without sufficient latitude of light and shade. For instance, in that process which consists of interposing a net-work of silk between a negative and a sensitive surface, all of the little squares of the net-work admitting the light are of the same size, thus producing a uniform shade in the underground of the picture, and the whites are also darkened. Without a special net-work made for each picture this cannot be avoided; but by adding this feature of my invention to the process above described I am able to vary the shade of the resulting picture at any point in any desired degree, and in an easy, quick, and economical way. This step consists of changing the proportions, wherever desired, of the actinic and non-actinic parts of a screen consisting of minute subdivisions—such as by adding to the screen after the image has been thrown thereon and before the final picture is taken some actinic and non-actinic substance in such way as to weaken, obliterate, or emphasize the lines of the screen to any desired degree and at any desired point. According to the well-known principles of engraving, as the dark lines or spaces of the resulting picture (the whites of the image on the screen) are increased in number or size the shadows of the resulting picture are deepened, and according as the white lines or spaces of the picture (the darks of the image) are increased in number or size the lights are emphasized. This may be accomplished in a variety of ways in my process.

One useful method, particularly suited to the easy and quick production of ordinary trade work—such as illustrations for books, papers, magazines, &c.—is by using the wire screen above described, and rubbing white chalk and black chalk upon it wherever it is desired to vary the shadows. Let us suppose the screen to be of dark wire over a white background and the image thrown thereon to be a negative. The shadows of the resulting picture will constitute the illuminated portions of the screen, upon which (i. e., the screen) the wires will appear as uniform equidistant black lines, and the lines will appear wherever there is any illumination, disappearing entirely only where no light falls on the screen—i. e., in the very highest lights of the resulting picture. To produce a darker shade at any desired point I mark the net-work at that point with white chalk. The chalk decreases the width of each dark line of wire it touches, increases the width of the intervening white lines or spaces, and hence deepens the shade of the resulting picture at that point just in proportion to the amount of chalk used. Where perfect darkness is desired, the lines may be entirely covered with chalk by rubbing it backward and forward a number of times with pressure. The white chalk which lies in the interstices of the wires has no effect, for it lies against a background already white. On the other hand, wherever an increase of light (a lessening of shadow) is desirable in the resulting picture, I accomplish it by similar use of black chalk, thereby partially filling up the white interstices of the wires. The highest lights, showing no lines at all, are produced by entirely filling the interstices with black chalk.

I do not confine myself to any particular method of practicing this feature of my invention. The principle lies in manipulating the screen by changing the proportions of its actinic and non-actinic subdivisions after the image has been thrown upon it. Other material than chalk having similar actinic qualities may be used. Screens having a flat surface may be manipulated upon the same principle—as, for instance, by adding or erasing lines or dots in some mechanical way. Other pieces of net-work may be laid over the screen, and many other variations may be made. One main advantage in this process over others is, that it yields very good results with a common printing negative, whether a thin or a dense one, and does not require any special kind. This treating of the image upon the screen, while of course depending upon artistic principles, does not require great manual dexterity for ordinary work, nor minute carefulness—such, for instance, as are required in retouching an electroplate. The chalk-lines may be roughly made. This is especially so when one is working with an enlarged image. The treatment modifies only the underground of the picture, while the main effect still remains, due to the variations of light and shade in the picture itself. Thus white chalk rubbed over black wires affects only the lines produced by those wires. If they compose, say, but one-quarter of the surface of the screen, the chalk can have only the same ratio of effect. Further, the chalk affects only illuminated parts, and if it happens to run over onto non-illuminated portions—as, for instance, where one is deepening a shadow adjacent to a high light—it has no effect there—*i. e.*, upon the high light; but if any errors are made they are very easily corrected by rubbing off the chalk or adding black chalk.

Either a positive or negative of the picture may be thrown upon the screen and treated upon the principles described; but there is a special advantage in the use of a negative, whether the shades are to be varied by treatment or not. If a positive were thrown up, the lines or design of the screen would be more distinct in the lights than in the shadows of the resulting picture, while the contrary is desirable. Again, it is the shadows which constitute the greater part of photographic pictures, and it is the shadows chiefly which require treatment upon the screen; but with a positive the shadows are the non illuminated parts upon the screen, and these cannot be treated on account of the absence of light there.

While any sort of screen may be treated to change the proportions of its actinic and non-actinic subdivisions by any method appropriate to that particular kind of screen, there are special advantages connected in this regard with a screen having a rough surface, and operating upon it with some friable material—such as rubbing chalk upon a wire screen in the way above described. Another form of screen suitable for the same purpose would be a sheet of metal with a surface of raised points or minute circles, the raised parts being made black and the depressions white. Sand-paper would produce a very soft effect. The advantage of operating with friable material upon a roughened surface lies not only in the ease of operation, but also in the variety of possible design in the underground, corresponding more or less to the combination, in one engraving, of lining, cross-hatching, stippling, &c. Thus in rubbing chalk over a net-work of wires the design or appearance of the lines differs greatly, according to the direction of the rubbing and according to the relative position of the camera in which the resulting picture is to be taken.

An extension of the processes above described, suitable to some purposes, consists of throwing up a negative first, treating that upon the screen, taking a photograph of it, throwing up the resulting positive upon the same or a different screen, and taking a photograph of that. By that means a more detailed and softer picture is obtained, since the lighter portions being illuminated by the second throwing up, the design of the screen will show in them more or less. It also affords an opportunity to introduce a greater variety of shades into the lights by treating the lights in the second image upon the same principles as the shadows were treated in the first.

The application of the process to the preparation of pictures for printing in several colors consists in throwing an image of the picture upon an entirely-dark or non-actinic screen, and then making actinic that part of the screen which corresponds to the different portions of the picture to be printed in a given color. Thus if the entire image be thrown up upon a flat black surface and white chalk be rubbed over the parts to be printed in a given color the resulting photograph will comprise just the parts of the picture to be printed in that color. A separate picture is made for each color, each of which is transferred to the electroplate or used in any appropriate way to prepare a printing-surface. If the cameras and screens are kept in exactly the same relative position for each color, the several resulting pictures must all be in the same proportion, thus avoiding one of the great difficulties in the preparation of plates for color-printing. The main idea of this last-described process does not require the use of a screen with minute subdivisions; but it may with great advantage be combined with the use of such a screen, the result being a lined picture for each color. Different kinds of screen may be used for different colors. So, also, artistic treatment may be given to the screen for each color to modify the lights and shades, as before described.

I claim as my invention—

1. The process of photographic copying, consisting of, first, throwing an image of the thing to be copied upon a screen in a dark-chamber, the surface of which screen is composed of actinic and non-actinic parts, and, second, taking a photograph of such image as appearing on the screen.

2. The process of making photographic lined pictures, consisting of, first, throwing an image of the picture upon a screen in a dark-chamber, the surface of which screen is subdivided more or less minutely into actinic and non-actinic lines or dots, and, second, taking a photographic picture of such image.

3. The process of making photographic lined pictures, consisting of, first, throwing an image of the picture upon a screen in a dark-chamber, the surface of which screen is subdivided more or less minutely into actinic and non-actinic lines or dots; second, varying by manipulation the relative proportions of the actinic and non-actinic subdivisions of the screen at different points on the image, so as to modify the lights and shadows therein as desired, and, third, taking a photographic picture of such image as so treated.

4. The process of making photographic lined pictures, consisting of, first, throwing a negative image of the picture upon a screen in a dark-chamber, the surface of which screen is subdivided more or less minutely into actinic and non-actinic lines or dots; second, varying by manipulation the relative proportions of the actinic and non-actinic subdivisions of the screen at different points on the image, so as to modify the lights and shadows therein as desired, and, third, taking a photographic picture of such negative image as so treated.

5. The process of making photographic pictures, consisting of, first, throwing an image of the picture upon a screen in a dark-chamber, such screen having a rough surface, the elevations of which are made actinic and the depressions non-actinic, (or vice versa;) second, varying the relative proportions of the actinic and non-actinic subdivisions of the screen at different points on the image, by rubbing over it chalk or other friable material, so as to modify the lights, shadows, or design of the screen, and, third, taking a photographic picture of such image as so treated.

6. The process of making photographic lined pictures, consisting of, first, throwing a negative image of the picture upon a screen in a dark-chamber, the surface of which screen is subdivided more or less minutely into actinic and non-actinic lines or dots; second, varying by manipulation the relative proportions of the actinic and non-actinic subdivisions of the screen at different points on the image, so as to modify the lights and shadows therein as desired; third, taking a photographic picture of such image as so treated; fourth, throwing upon the screen an image of the resulting lined positive picture, and, fifth, taking a photographic picture of such image.

7. The process of preparing photographic pictures for printing in several colors, consisting of, first, throwing an image of the entire picture upon a non-actinic screen in a dark-chamber; second, making actinic that portion of the screen which corresponds to the portion of the picture to be printed in a given color, and, third, taking a photographic picture of the partial image thereby made to appear upon the screen.

8. The process of preparing photographic pictures for printing in several colors, consisting of, first, throwing an image of the entire picture upon a non-actinic screen in a dark-chamber, the surface of which screen is composed of more or less minute elevations and depressions; second, making actinic either the elevations or depressions upon that portion of the screen which corresponds to the portion of the picture to be printed in a given color, and, third, taking a photographic picture of the lined partial image thereby made to appear upon the screen.

In witness whereof I have hereunto set my hand, this 25th day of July, 1887, in the presence of two witnesses.

ALFRED A. HART.

Witnesses:
   GEO. C. BRAINERD,
   SALTER S. CLARK.